United States Patent [19]
Whitlow

[11] 4,353,103
[45] Oct. 5, 1982

[54] GROUND FAULT INTERRUPTER CIRCUIT

[76] Inventor: George A. Whitlow, Box CL96-1, Murchison, Tex. 75778

[21] Appl. No.: 252,149

[22] Filed: Apr. 8, 1981

[51] Int. Cl.³ ............................................. H02H 3/16
[52] U.S. Cl. ...................................................... 361/45
[58] Field of Search .............................. 361/44, 45, 46

[56] References Cited

U.S. PATENT DOCUMENTS

| | | | |
|---|---|---|---|
| 3,555,360 | 1/1971 | Lee et al. ............................... | 361/45 |
| 3,859,567 | 1/1975 | Allard ..................................... | 361/45 |
| 4,047,079 | 9/1977 | MacPhee ............................... | 361/45 |
| 4,091,431 | 5/1978 | Morris .................................... | 361/45 |

*Primary Examiner*—Harry E. Moose, Jr.
*Attorney, Agent, or Firm*—Thorpe, North & Western

[57] ABSTRACT

A ground fault interrupter (GFI) circuit for interrupting alternating current delivered in a power distribution system whenever a ground fault current exceeding a prescribed level is sensed. The GFI circuit includes a differential current sensing apparatus for sensing the presence of a ground fault current and generating a control signal that assumes a first condition whenever the ground fault current exceeds the prescribed level and for assuming a second condition whenever the ground fault current is less than the prescribed level. A charging circuit is charged with an electrical charge during a fixed portion of each cycle of the alternating current if the control signal has assumed the first condition. If the control signal has assumed the second condition, the charging circuit is discharged during a fixed portion of each cycle of the alternating current, thereby preventing any substantial charge from being stored in the charging circuit. A trigger circuit generates a trigger signal whenever the accumulated charge in the charging circuit exceeds a threshold level, which threshold level is reached within one cycle of the alternating current. Conventional switch means are used to interrupt the current flow in the power distribution system in response to this trigger signal.

28 Claims, 5 Drawing Figures

GROUND FAULT INTERRUPTER CIRCUIT

BACKGROUND OF THE INVENTION

This invention relates to ground fault interrupter (GFI) circuits, and more particularly to an improved GFI circuit that reliably senses undesired ground fault currents of as small as 5 ma and, in response thereto, interrupts the current flow of the electrical distribution system wherein the ground fault current occurs.

A GFI circuit is a device which interrupts a circuit upon the occurrence of a ground fault current of substantially less magnitude than required to activate other types of protective devices. The ground fault current which will activate such a device is also substantially less than the current that normally poses a shock hazard to humans—for example, less than 0.1 ampere. For purposes of this application, the value of ground fault current at which a GFI device is activated will be referred to as the "ground fault trigger current."

In recent years, GFI devices have been required by electrical codes to be activated whenever the ground fault current exceeds 5 ma. In order to reliably sense this relatively small value of current (compared to other values of current that typically flow in an electrical distribution system) a circuit of significant sophistication has been required. Such sophistication is expensive, not only in design costs, but also in manufacturing costs. Moreover, unless a very good quality of circuit components is maintained, such sophistication does not necessarily produce a more reliable circuit.

U.S. Pat. Nos. 3,555,360, 3,558,980, 3,769,548 and 3,859,567, are exemplary of prior art GFI devices. The most common element of these prior art devices is the "differential transformer" which typically includes a toroidal magnetic core upon which a pair of identical primary windings of relatively few turns are wound. These windings are connected in series respectively with the line (or "hot") conductor and the neutral (or "ground") conductor of the electrical distribution system that delivers electrical power from an input power source to a load. These primary windings are wound such that under normal conditions—that is, when no undesirable ground fault connections are present—the net magnetic flux generated is zero. This is because the flux induced by the current flowing to the load through one winding is cancelled by an opposing flux induced by this same current returning from the load through the other winding. If a ground fault connection should be present, however, so that the current flowing to the load through one winding is not equal to the current returning from the load through the other winding, then the net magnetic flux is no longer zero. This non-zero magnetic flux is then used to induce a voltage in a secondary winding of the toroidal core, which secondary winding is connected to the input of an amplifier. The amplifier, in turn, acts through an appropriate control device to open the line conductor and interrupt the current flow therein.

A common problem associated with the use of toroidal magnetic cores as above described is achieving the desired and requisite sensitivity of the GFI device. That is, because the ground fault trigger current is very small, it is typically necessary that the secondary winding have many more turns thereon than each primary winding. This results in a very bulky and costly differential transformer. One solution to this problem has been to induce a bias flux in the magnetic core, such as is described in this inventor's prior patent, U.S. Pat. No. 3,662,218, or in the other patents cited above. Such a bias flux generally serves to overcome core losses and brings the operation of the differential transformer into a higher permeability portion of the B-H curve of the particular toroidal core that is employed. This bias flux is typically introduced into the core by allowing an alternating bias current to flow through the secondary winding, such as is described in all but one of the aforecited patents. (U.S. Pat. No. 3,558,980 teaches introducing the bias current into one of the primary windings rather into the secondary winding.)

A further problem associated with prior art GFI devices is achieving the desired sensitivity of the device given the parameter tolerances of the various parameters, including component values, that make up the device. Such parameters include the coupling coefficient of the windings on the toroidal core, the permeability of the core, the amplifier gain, and so forth. While it has generally been possible to construct prior art GFI devices that are sensitive to the desired ground fault current level, such construction has invariably required the individual adjustment of selected parameters (such as the bias currents, or flux, coupling coefficients, and the like). Such individual adjustments severely hamper the degree to which the device can be economically manufactured in large quantities.

A still further problem associated with all known existing GFI devices is their reliability. There are relatively few homeowners living in homes of newer construction (wherein GFI devices are required by code for all outside, garage, and/or bathroom circuits), or contractors who are required by code to use GFI devices during construction, who have not, at one time or another, been very unhappy with the GFI devices that have been used. Either the device is too sensitive, being falsely tripped (falsely sensing a ground fault current) by the presence of electrical noise or a transient on the line conductor, in which case the GFI device becomes a real nuisance; or the device is not sensitive enough, hazardously allowing a ground fault condition to exist for a dangerously long period of time, in which case the GFI device becomes a real safety hazard. These same problems exist, of course, for the commercial or industrial user of GFI devices as well. Of these problems, the nuisance problem is perhaps the most prevalent because manufacturers of GFI devices typically design their devices to be overly sensitive, therefore erring on the side of safety rather than on the side of inconvenience.

SUMMARY OF THE INVENTION

A principal object of the present invention is to provide a GFI circuit that is simple, both in construction and operation, and that requires no individual adjustment during the manufacturing process, thereby facilitating the mass production of the device.

Another objective of the present invention is to provide such a GFI circuit that is reliable, and safe, consistently being triggered only when a ground fault current exceeding or equal to a prescribed ground fault trigger current is sensed.

A still further object of the present invention is to provide such a GFI circuit that is essentially immune to false triggering, being triggered only by the sensing of the desired value of ground fault trigger current and not by transients, or other non-dangerous irregularities, occurring within the electrical distribution system.

The above and other objects of the present invention are realized in a preferred embodiment that includes a pair of conductors, one "hot" and one "neutral," for connecting a load across a source of alternating input current. A controllable switch is advantageously placed in series with the "hot" conductor, and is adapted to open, thereby interrupting current flow to the load, in response to an appropriate trigger signal. A differential current sensing apparatus is employed to generate a control signal that is a function of the difference between the current flowing to the load through one of the pair of conductors and the current returning from the load through the other conductor of the pair of conductors. This control signal assumes a first condition whenever the current sensed by the differential sensing apparatus equals or exceeds the prescribed value of ground fault trigger current. In response to this first condition, a charging circuit, coupled to the "hot" conductor, allows an electrical charge to accumulate on a storage element. As soon as this accumulation of electrical charge reaches a threshold level, which threshold level is attainable within one cycle of the alternating current, a trigger circuit generates the trigger signal that opens the above referred to switch, thereby interrupting the flow of current to the load.

If the current sensed by the differential current apparatus is less than the prescribed value of ground fault trigger current, then the control signal assumes a second condition. As long as this second condition of the control signal is present, the storage element is discharged, or shorted out, during at least a portion of each cycle of the alternating current, thereby preventing the accumulation of electrical charge on the storage element above the threshold level. This action, of course, maintains the continuity of the electrical distribution system and allows current to continue to flow to the load.

The use of a storage element in this fashion, wherein it is repetitively charged or discharged depending upon whether a ground fault condition exists or not, advantageously allows the GFI circuit of the present invention to be very reliable and safe. Such a GFI device always responds quickly, opening the circuit within one cycle whenever a true ground fault condition exists. However, such a circuit is rarely, if ever, falsely tripped or triggered because the storage element acts as a filter, swamping out the effects of electrical noise or transients that do not reflect a true ground fault condition.

In a preferred embodiment, the differential current sensing apparatus may be realized using a differential transformer that includes a toroidal magnetic core having two identical primary windings and one secondary winding. A bias flux having a known phase relationship with the line voltage, or voltage on the "hot" conductor, is induced in the toroidal core. Under normal conditions (no ground fault condition existing), this bias flux is responsible for inducing a voltage signal in the secondary winding. This voltage signal is then amplified by a suitable amplifier so as to generate the above referenced control signal. The polarity of the bias flux is selected so that as the flux induced by the difference between the current flowing to the load and the current returning from the load increases, i.e., as the value of a ground fault current increases, the bias flux is cancelled out. Thus, the control signal has a decreasing amplitude as the ground fault current increases from zero. The magnitude of the bias flux is selected so that the control signal is zero, or nulled out, (no net flux present in the toroidal core, including the bias flux) when the ground fault current equals the prescribed value of ground fault trigger current. As the ground fault current increases beyond this trigger level, and net flux in the toroidal core will also increase, but in a direction opposite to that of the bias flux. Thus, the control signal will increase from zero, but will have a phase that has inverted 180° from what is was in the absence of a ground fault current. Thus, in this preferred embodiment, as described, the first and second condition of the control signal, (which first and second conditions control whether the storage element is allowed to be charged or not), are determined by the phase relationship of the control signal with respect to the line volage. Advantageously, therefore, the amplitude of the control signal has little effect on the proper operation of the GFI device. This results in a circuit that can be easily built and operated over a wide range of circuit parameters and tolerances.

BRIEF DESCRIPTION OF THE DRAWINGS

The above and other objects of the invention will be more apparent from the following more particular description presented in connection with the accompanying drawings in which.

DETAILED DESCRIPTION OF THE INVENTION

The present invention is best understood by reference to the drawings wherein like numerals will be used to designate like parts throughout.

Figure 1:
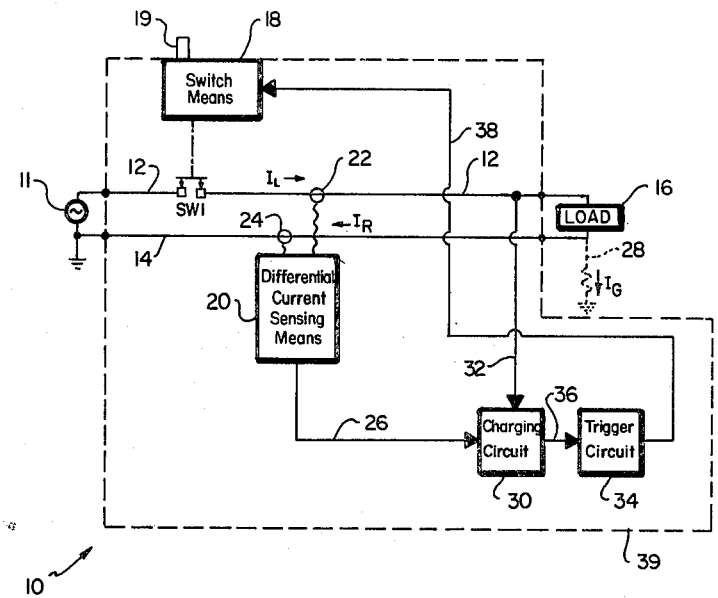
FIG. 1 is a simplified schematic drawing, predominantly in block form, illustrating the GFI circuit of the present invention.

Referring first to FIG. 1, there is shown a simplified block diagram of a GFI circuit 10. A source of alternating current 11 is connected to a "hot" conductor 12 and a "neutral" conductor 14. These two conductors 12 and 14 allow the input current source 11 to be connected across a load 16. A switch, SW1, is interposed in conductor 12 so as to interrupt the current flow therethrough in response to being activated by switch means 18. Switch means 18 includes manual reset means 19.

Differential current sensing means 20 are employed to sense the difference between the current flowing to the load 16, $I_L$, through conductor 12 and the current returning from the load 16, $I_R$, through conductor 14. Under normal conditions, i.e., when no ground fault current is present, the current delivered to the load, $I_L$, will be equal to the current returning from the load, $I_R$.

It should be noted that the current directions suggested by the arrows in FIG. 1 depict the current $I_L$ going to the load 16 over conductor 12 and the current $I_R$ returning from the load over conductor 14. These directions are only representative. In fact, because the current source 11 is an alternating current source (typically alternating at a 50–60 Hz rate), the current flow directions shown will only be true for one half of each cycle of the alternating current. Nonetheless, for those not thoroughly familiar with the operation of GFI devices, the directions shown will be very helpful in the discussion that follows.

As mentioned, the differential current sensing means 20 senses the differences between the current $I_L$ and the current $I_R$. The conductor 12 has associated therewith a coupling point 22 and the conductor 14 has a similar coupling point 24, which coupling points are part of the differential current sensing means 20. The output of the differential sensing means 20 is a control signal that appears on signal line 26. This control signal may assume one of two conditions at any given time. If a ground fault condition exists, such that a ground fault current, $I_G$, ($I_G$ having a value equal to or greater than the designated ground fault trigger current) flows to ground through a path other than through the conductor 14, such as through the path 28, then the control signal on signal line 26 assumes a first condition. If, however, there is no ground fault current, (that is, if $I_G$ as shown in FIG. 1 equals zero), then the current $I_L$ will equal the current $I_R$ and the control signal on signal line 26 will assume a second condition.

It is to be understood that the representation in FIG. 1 of having $I_G$ flow to ground through the impedance path 28 (shown in dashed lines) is only representative of the numerous and varied ways in which a ground fault condition could occur. Thus, whereas FIG. 1 shows the path 28 as being connected between the conductor 14 and ground, this ground fault condition should also occur between the conductor 12 and ground. For purposes of this application, the significance of the ground fault condition is that whenever such a ground fault condition exists, then the current $I_R$ will not be equal to the current $I_L$; rather, the current $I_R$ plus $I_G$ will equal $I_L$. The principal objective of the present invention, of course, is to detect whenever $I_G$ equals or exceeds its prescribed trigger value, and to open up the switch SW1 in response to this condition.

If the control signal has assumed the first condition, then an electrical charge is allowed to accumulate on a storage element contained in a charging circuit 30. This electrical charge is derived from the voltage appearing on the "hot" conductor 12 and delivered to the charging circuit 30 over signal line 32. As soon as this charge accumulates above a threshold level, the charging circuit 30 generates a trigger signal which it sends to a trigger circuit 34 over signal line 36. The trigger circuit 34, in response to this trigger signal, activates the switch means 18 by means of an activation signal appearing on signal line 38. The switch means 18, in response to this activation signal, opens the switch SW1, thereby interrupting the flow of the current $I_L$ through the conductor 12. The switch SW1 must be manually reset, through manual reset means 19, before the input circuit 11 can again be connected to the load 16.

If the control signal on line 26 assumes its second condition—that is, if the differential current sensing means 20 determines that the current $I_R$ is equal to the current $I_L$ meaning that the ground fault current $I_G$ is zero)—then the charging circuit 30 does not allow any charge to accumulate on its storage element. Thus, neither the trigger circuit 34 nor the switch means 18 are activated and the currents flowing through the conductors 12 and 14 are allowed to continue to flow uninterrupted.

Advantageously, the entire GFI device 10 may be encapsulated, or otherwise housed, in a suitable physical configuration that allows it to be readily and conveniently inserted into a conventional electrical control panel or recepticle box. Such encapsulation, or housing, is depicted symbolically in FIG. 1 by the dashed line 39.

Figure 2:
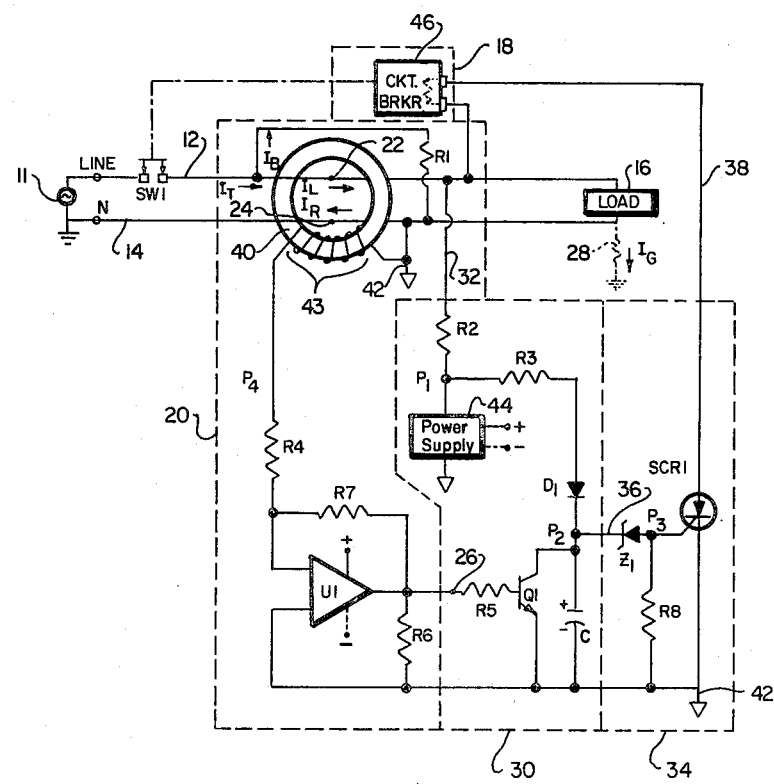
FIG. 2 is a schematic circuit diagram showing a preferred embodiment of the present invention.

Referring next to FIG. 2, there is shown a schematic circuit diagram showing one preferred embodiment of the present invention. In this embodiment, the differential current sensing means 20 is realized using a toroidal core 40 having two primary windings, 22 and 24 respectively, and one secondary winding, 43. The primary windings 22 and 24 of this toroidal core 40 are symbolically depicted in FIG. 2 as one turn windings, meaning that the conductors 12 and 14 merely pass through the center of the toroid. In constrast, the secondary winding 43 is depicted as a multi-turn winding. Typically, this winding 43 may have 1000 turns, and be wound with No. 40 wire on a toroid core, Model No. 5025P, manufactured by Magnetic Metals, Inc., Camden, N.J. Of course, if desired, the primary windings could be realized with more than one turn; however, one turn has proven to be sufficient and greatly facilitates the construction of the GFI device.

One side of the secondary winding 43 is grounded at 42, while the other side of the winding is connected through resistor R4 to one of the inputs of an operational amplifier (op amp) U1. This op amp could be realized using almost any commercially available op amp, such as a TL091 or UA741, both manufactured by Texas Instruments, Richardson, Tex. Resistor R7 is used in connection with the op amp U1 to control its gain. Resistor R6 is used as a bias resistor to insure that the op amp output is at a proper dc level for interfacing with the charging circuit 30.

The current $I_L$ flowing through the center of the toroid core 40 induces a magnetic flux therein according to well known principles of electromagnetic induction. Similarly, the current $I_R$, which also passes through the center of the toroid core 40, induces an opposing magnetic flux. If the current $I_L$ equals the current $I_R$ then the net magnetic flux in the core is zero and there would be no voltage induced in the secondary winding 43. Under normal conditions (no ground fault condition) this is not the case, however, because a bias flux is induced in the core 40 by means of a bias current $I_B$. This current $I_B$ flows from the line conductor 12 on the input current source side of the core 40, through resistor R1, to the neutral conductor 14 on the load side of the core 40. Assuming that the line voltage on conductor 12 is a constant value (which is generally the case), the value of the resistor R1 sets the value of the bias current $I_B$.

From the above description, it is thus seen that the total current $I_T$ flowing from the current source 11 is divided into two components: a load component $I_L$ that is delivered to the load 16; and a bias component $I_B$ that bypasses the coupling point or winding 22 and is directed to the load side of the neutral conductor 14. Assuming that a ground fault current $I_G$ may return to source ground through an alternate path other than the neutral conductor 14, such as that represented by the dashed impedance 28 in FIG. 2, the following relationships thus apply:

$$I_T = I_B + I_L$$

$$I_R = I_L + I_B - I_G$$

Hence, under normal conditions, when $I_G$ equals zero, the difference between the currents flowing through the coupling points 22 and 24 is $I_B$. As explained above, this current $I_B$ induces a magnetic flux in the core 40 which, in turn, induces a voltage signal in the secondary winding 43, which voltage signal is directed to an input of the op amp U1.

As the above equations show, as the ground fault current $I_G$ increases from zero, a point is reached where $I_G$ equals $I_B$, at which point the current $I_L$ is in fact equal to the current $I_R$ and the net magnetic flux in the core is zero. Such a condition, of course, causes the voltage induced in the secondary winding 43 to also go to zero. As the ground fault current $I_G$ increases to values greater than $I_B$, the current $I_L$ becomes greater than the current $I_R$, causing the net magnetic flux in the core 40 to change direction. Such a change in direction causes the signal induced in the secondary winding 43 to also be inverted, or to change phase 180°. Hence, it is seen that the control signal, or the output signal of the op amp U1, is a signal that has a decreasing amplitude as $I_G$ increases from zero. This control signal eventually is nulled to zero when $I_G = I_B$. Thereafter it increases from zero as $I_G$ increases beyond $I_B$, but with an opposite phase from that which it had when $I_G$ was equal to zero.

The frequency of the control signal is the same frequency as the current source 11. Furthermore, this control signal has a known phase relationship with respect to the current $I_L$. In fact, for all practical purposes, this control signal will either: (1) be initially in phase with the current $I_L$ (when $I_G$ equals zero), null to zero (as $I_G$ equals $I_B$), and be 180° out of phase with $I_L$ (as $I_G$ increases beyond $I_B$); or (2) the control signal will be out of phase 180° with the current $I_L$ (when $I_G$ equals zero), null to zero (as $I_G$ equals $I_B$), and in phase with $I_L$ (when $I_G$ exceeds $I_B$). The actual polarity of the control signal will depend, of course, on the manner in which the secondary winding 43 of the toroidal core 40 is wound and whether the op amp U1 is used in an inverting or non-inverting mode.

Still referring to FIG. 2, the charging circuit 30 includes a storage element or capacitor C that is shunted by a transistor switch Q1. A voltage dividing network comprised of the resistor R2 and a power supply 44 provides a voltage at the point P1 that is reduced from the voltage appearing on the line conductor 12. Typically, if the line voltage on conductor 12 is 115 volts rms, then the resistor R2, in combination with the power supply 44, is selected so that the voltage at point P1 is approximately 20 volts rms. The diode D1 is then used in series with the resistor R3 as a half wave rectifying network so that only the positive half cycles of the signal at P1 is directed to the capacitor or storage element C. The power supply 44 is not only used as an element of the voltage dividing network above described, but also provides the requisite dc voltage for powering the op amp U1. If U1 is realized in FIG. 2 by using a TL091 op amp, then only a positive voltage is required to power it, thereby greatly facilitating the design and manufacture of the power supply 44.

For the embodiment shown in FIG. 2, it is desirous to have the control signal on line 26 in phase with the line voltage on conductor 12. Thus, the positive half cycle of the control signal on line 26 will serve to turn on the transistor switch Q1 at the same time that the positive half cycle of the waveform appearing at the point P1 is directed to the capacitor C through the rectifying diode D1. In this condition, no charge is allowed to accumulate on capacitor C because every time a charging current flows through the diode D1 (during the positive half cycle of the voltage waveform appearing at point P1) it is shorted to ground through the transistor switch Q1. If, however, the control signal changes phase, as would occur when the ground fault current $I_G$ exceeds the bias current $I_B$, then the turning on of transistor switch Q1 is no longer synchronized with the charging of capacitor C, and a charge is allowed to accumulate on capacitor C. This charge reaches, typically within one cycle of the line voltage, the breakdown voltage of the zener diode Z1, which zener diode Z1 is a part of the trigger circuit 34.

As soon as a current flows through the zener diode Z1, when its breakdown voltage is reached, the voltage at point P3 will rise to a point sufficient to turn on the silicon controlled rectifier SCR1. Once SCR1 is turned on, of course, it allows current to flow from the line conductor 12 through a conventional circuit breaker element 46 of the switch means 18 to the ground return point 42. This action, in turn, causes the circuit breaker element 46 to open the switch SW1. With the switch SW1 open, the current flow through conductor 12 is interrupted, and once interrupted, as explained previously, it must be manually reset before normal operation may again be initiated. If the source of the ground fault current $I_G$ is not corrected, however, the switch SW1 will immediately reopen in the same fashion.

Figure 3:
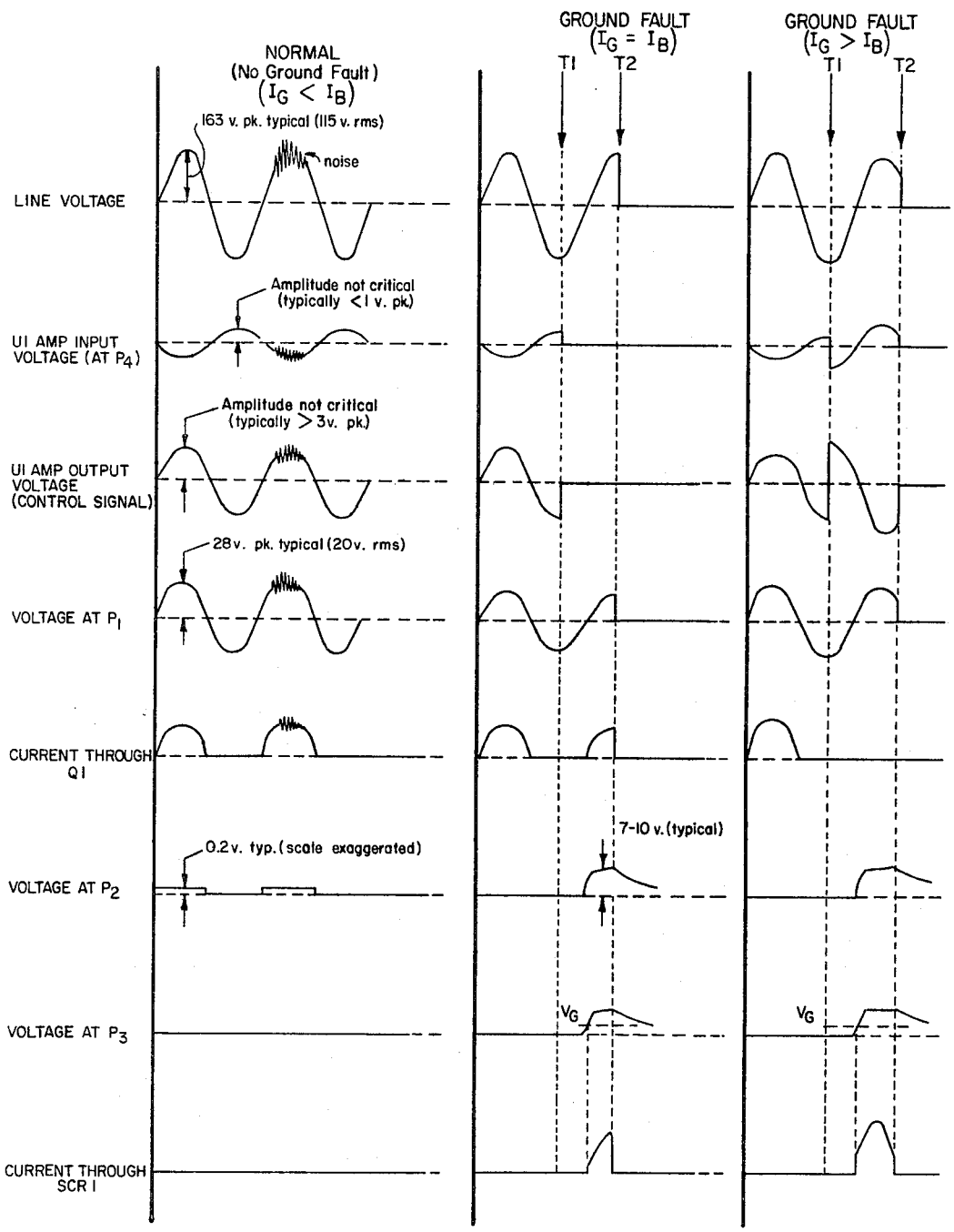
FIG. 3 is a timing diagram, illustrating some of the voltage and current waveforms associated with the operation of the circuit of FIG. 2.

Referring next to FIG. 3, there is shown a timing diagram that illustrates some of the key voltage and current waveform associated with the operation of the circuit of FIG. 2. For example, the left hand side of FIG. 3 illustrates the waveforms associated with normal operation (no ground fault condition) of the GFI circuit. In such a situation, the line voltage appearing on the line conductor 12 might illustratively be as shown in the top waveform. The op amp input voltage (at point P4 in FIG. 2) as well as the op amp output voltage (the control signal) are also depicted. As shown, an inverting mode of the operational amplifier is contemplated. However, the system could also operate if a non-inverting mode were employed and the polarity of the secondary winding 43 were inverted. The voltage at point P1 in the charging circuit 30 is also shown. It is evident that this voltage is in phase with the control signal appearing at the op amp output. As explained above, the transistor switch Q1 is turned on during the positive half cycle of the control signal. Thus, the current through Q1 is as shown in the labeled waveform. Similarly, the voltage at the charging point P2 is also shown. It is evident that this voltage never reaches a point that is much greater than zero. Accordingly, the voltage at P3 remains at ground potential, thereby preventing any current from flowing through SCR1.

The waveforms in the center of FIG. 3 depict the situation where a ground fault current $I_G$ is approximately equal to the bias current $I_B$. The waveforms of FIG. 3 also assume that the ground fault condition begins at time T1. As the waveforms show, prior to the time T1, the input voltage to the op amp U1 (at point P4) and the control signal at the output of the op amp U1 are the same as the waveforms at the left of FIG. 3. However, subsequent to the time T1, both of these voltages are nulled to zero. Once the control signal goes to zero in this fashion, it no longer controls the transistor switch Q1, thereby keeping this switch in an off condition. As such, an electrical charge is allowed to accumulate on the capacitor C as shown by the voltage waveform at point P2. As shown, the voltage at point P2 rises to the zener breakdown voltage of the zener diode Z1. Typically, this value will be from 7 to 10 volts. As soon as this zener potential is reached, which occurs within that portion of the current cycle during which the capacitor C begins to charge, the voltage at point P3 also begins to rise as some current begins to flow through the zener diode Z1. As the voltage at point P3 rises, the threshold gate voltage of SCR1, $V_G$, is quickly reached, thereby turning SCR1 on and allowing current to flow therethrough. This current, of course, activates the circuit breaker 46.

At the right of FIG. 3, the waveforms associated with a ground fault condition wherein the ground fault current $I_G$ is greater than the bias current $I_B$, are shown. For the most part, these waveforms are identical to those in the center of FIG. 3, except that the voltage at point P4 (op amp input) and the control signal (op amp output) change phase by 180° as soon as the ground fault condition occurs at time T1. This change in phase maintains the switch Q1 in an off position during the charging portion of the cycle. Thus, the voltage at the point P2 is allowed to reach the zener breakdown voltage, which in turn allows SCR1 to be turned on.

Once the silicon controlled rectifier SCR1 is gated on by the voltage at point P3 reaching the gate potential of SCR1, the amount of time required to activate the circuit breaker element 46 is a function of the particular type of element that is employed. If the device is of a conventional relay type, then a relatively short pulse of current is all that would be required to cause switch SW1 to open, as shown in the bottom middle waveform. In such a case, switch SW1 will typically respond within ⅛ cycle of the line voltage (or 45 electrical degrees) from time T1 when the ground fault conditions begins. Should a thermal circuit breaker element be employed, however, meaning one that responds to the temperature rise in a resistive element thereof caused by the current flow therethrough, then perhaps a longer pulse of current would be required, as shown in the bottom right waveform of FIG. 3. In any event, as the waveforms of FIG. 3 show, the GFI circuit of FIG. 2 typically responds within one cycle of the line voltage. This feature alone provides a GFI device that is safe and reliable to use.

The waveforms of FIG. 3 are also helpful in illustrating the immunity of the GFI device of FIG. 2 to noise and transients appearing on the line conductor 12. The waveforms shown at the left of FIG. 3 depict what a typical transient or a noise glitch might look like when superimposed on the line voltage. Such noise or transients might occur whenever a motor or other inductive device is energized through the conductors 12 and 14. As can be seen, this noise has no adverse affect on the operation of the device. That is, so long as the transistor switch Q1 is turned on so as to discharge the capacitor C, the noise has no affect whatsoever. It is also significant to note that the amplitude of the op amp U1 input voltage, at point P4, as well as the amplitude of the control signal, are not critical parameters. Thus, the coupling coefficients of the primary and secondary windings, as well as the permeability of the toroidal core 40, could all vary a great deal and the circuit would still function as designed. All that need be done is to ensure that the bias current $I_B$ assumes a value fairly close to the desired ground fault trigger current. This can readily be achieved, given the tolerances of typical line voltages and resistors, by merely selecting an appropriate value for the resistor R1. For example, if the ground fault trigger current is to be 5 ma, and if the line voltage has a value of 110 volts rms, then the resistor value R1 should be selected to be 22K ohms.

Figure 4:
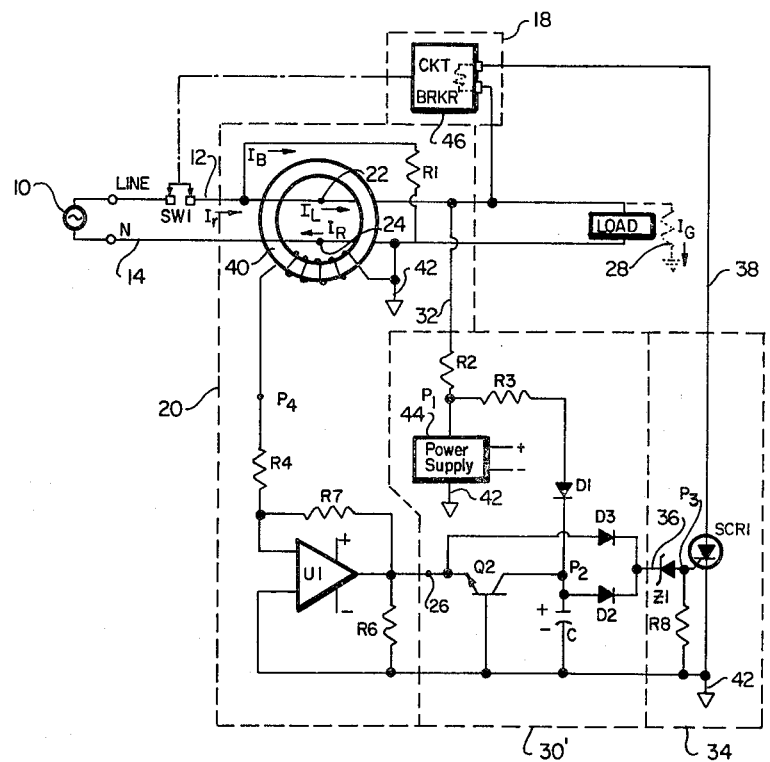
FIG. 4 is a schematic circuit diagram, depicting an alternate embodiment of the present invention.

In FIG. 4, an alternate embodiment of the present invention is shown in which the charging circuit has been changed. This changed charging circuit is labeled 30'. Other areas of the circuit of FIG. 4 are identical to the circuit shown in FIG. 2, and will not, therefore, be discussed again.

The charging circuit 30' of FIG. 4 includes a charging capacitor C that is charged through a half wave rectifier circuit that includes resistors R3 and D1 as described previously in connection with the charging circuit 30 of FIG. 2. However, the transistor switch Q2 of FIG. 4 is a PNP transistor that is employed in a common base (base grounded) configuration. The emitter terminal of the Q2 transistor is tied to the signal line 26 on which the control signal appears. A negative voltage swing on signal line 26, below ground potential, will thus turn transistor Q2 on, thereby effectively shorting the charging point P2 to the output of the op amp U1. If this alternate configuration of FIG. 4 is employed, it is thus necessary that the control signal on signal line 26 go negative at the same time that a charging current is directed through D1 to the capacitor C during normal operation (no ground fault current condition existing, or $I_G=0$). This is opposite to the phase relationship that was required for proper operation of the circuit shown in FIG. 2. However, this opposite phase relationship is easily achieved by merely employing the U1 op amp in an opposite mode (e.g., non-inverting if it was previously inverting), or by switching ends of the secondary winding 43 on the differential transformer core 40.

Diode D3 in FIG. 4 blocks the negative voltage at the output of the op amp U1 from the zener diode Z1. Should the output of the op amp U1 go sufficiently positive, diode D3 will become forward biased through the zener diode Z1 and resistor R8 to ground. However, at this same time, the anode of SCR1, which is connected to the line conductor 12 through the signal line 38, is negative, thereby preventing the SCR1 from turning on. Diode D2 is inserted into the circuit to block any positive voltage occuring during this half cycle from finding its way onto the capacitor C.

Both embodiments of the invention shown in FIGS. 2 and 4 are relatively immune from being falsely tripped by undesirable noise. In most prior art GFI devices, a very high amplification factor is required to transform the signal from the miniaturized differential transformer to a usable value. Unfortunately, electrical noise is also amplified that my cause false tripping of the GFI device. However, in the present invention, the silicon controlled rectifier SCR1 (which must be turned on to ultimately trigger the switch means 18), is isolated from this noise by the charging circuit 30. This arrangement very efficiently prohibits any electrical noise from turning on SCR1. Also, it should be noted that the duration of noise pulses compared with one cycle of line current or voltage is typically small, and the time constant of R3 and C sufficiently swamps out the affects of any electrical noise that might otherwise appear in the charging circuit 30.

Figure 5:
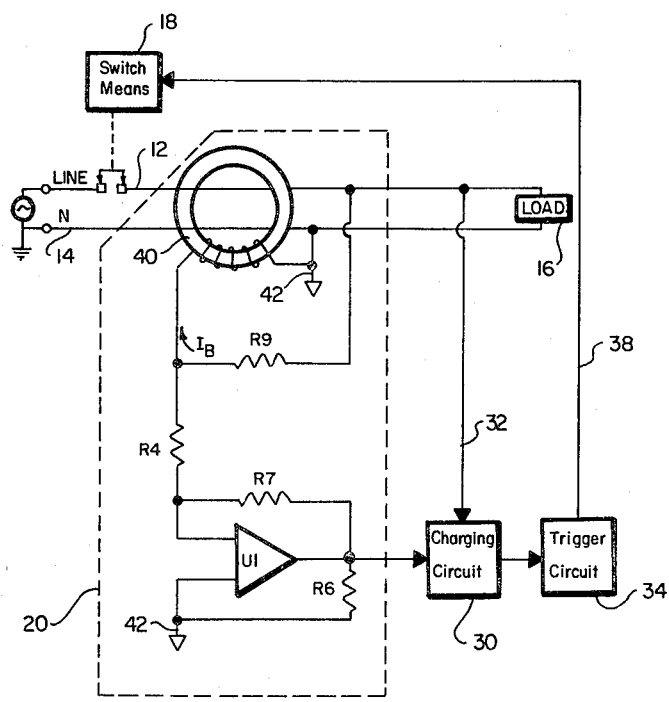
FIG. 5 shows a simplified schematic circuit diagram, partially in block form, showing still another alternate embodiment of the present invention.

In FIG. 5, still another alternate embodiment of the invention is shown. In this third embodiment, either the charging circuit 30 of FIG. 2 or the charging circuit 30' of FIG. 4 could be employed. The difference in FIG. 5 is that the bias flux is induced on the core 40 by a bias current $I_B$ that flows through a resistor R9 that is connected from the "hot" conductor 12 to one end of the secondary winding 43, the other end of the same winding being connected to the neutral or ground conductor 14 at the GFI device ground point 42. In this fashion, the bias current $I_B$ actually flows through both primary windings in opposite directions so that its effect through the primary windings is cancelled out. However, the injecting of this current into the secondary winding 43 produces the bias flux.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. A ground fault interrupter circuit for use in a power distribution system that interrupts the current flow therein whenever a ground fault current exeeding a predetermined value is detected, said ground fault interrupter circuit comprising:

a pair of conductors for connecting a load across an input circuit of alternating current, a first conductor of said pair of conductors having an alternating line voltage thereon and a second conductor of said pair of conductors having a zero voltage thereon with respect to a ground reference potential, said second conductor therefore being the return or neutral conductor;

switch means capable of opening at least said first conductor of said pair of conductors for preventing current from being delivered to said load from said input circuit in response to a trigger signal;

differential current sensing means for sensing the difference between the current flowing through said first conductor at a first coupling point thereof and the current returning through said second conductor at a second coupling point thereof, and for generating a control signal that is a function of said instantaneous difference;

charging circuit means coupled to said pair of conductors for charging a storage element with an electrical charge during at least a portion of each cycle of said alternating current in response to a first condition of said control signal, said first condition indicating that the difference sensed by said differential current sensing means is at least as great as said predetermined value of ground fault current, and for discharging said storage element during at least a portion of each cycle of said alternating current in response to a second condition of said control signal, said second condition indicating that said difference sensed by said differential current sensing means is less than said predetermined value of ground fault current; and trigger means coupled to said charging circuit means for generating said signal whenever a predetermined value of electrical charge accumulates on said storage element.

2. A ground fault interrupter circuit as defined in claim 1 wherein said differential current sensing means comprises:

transformer means having first and second windings coupled to a magnetic core for generating a magnetic flux in said core proportional to the difference between the current flowing through said first winding and the current flowing through said second winding, said first and second windings being connected respectively in series with said first and second conductors at their respective coupling points such that the magnetic flux induced in said core by a given current flowing to said load through said first conductor is cancelled by the magnetic flux induced in said core by said given current returning from said load through said second conductor;

bias means for inducing a magnetic bias flux in said core;

sensing means coupled to said core for sensing the net magnetic flux present in said core at any instant of time and for generating a voltage signal proportional to said net magnetic flux; and amplification means for amplifying said voltage signal, said control signal comprising an output signal from said amplification means, said control signal assuming said second condition whenever said current flowing through the coupling point of said first conductor is approximately equal to the current returning through the coupling point of said second conductor, the second condition of said control signal thus indicating that the net magnetic flux in said core is dominated by said magnetic bias flux, said control signal further assuming said first condition whenever the difference between the current flowing through the coupling point of said first conductor and the current flowing through the coupling point of said conductor is of a magnitude sufficient to induce an opposing magnetic flux in said core that exceeds said bias magnetic flux, the first condition of said control signal thus indicating that the net magnetic flux in said core is dominated by said opposing magnetic flux.

3. A ground fault interrupter circuit as defined in claim 2 wherein said charging circuit means comprises:

rectifying means for presenting a half-wave rectified signal derived from said line voltage to said storage element during a selected one half of the cycle of said line voltage; and discharge means for selectively discharging said storage element in response to said second condition of said control signal, and for selectively charging said storage element with said rectified signal in response to said first condition of said control signal.

4. A ground fault interrupter circuit as defined in claim 3 wherein:

said storage element comprises a capacitor; and said discharge means comprises a discharge switch connected to said capacitor, a closed position of said discharge switch causing said capacitor to be discharged and preventing any charge from accumulating thereon, and an open position of said dishcarge switch allowing a charge to accumulate on said capacitor, said open and closed positions of the discharge switch being controlled by said first and second conditions of said control signal.

5. A ground fault interrupter circuit as defined in claim 4 wherein said control signal is an alternating signal having a frequency the same as said line voltage and a known phase relationship with respect to said line voltage, and wherein said control signal controls said discharge switch to close during a first half cycle of said control signal and to open during a second half cycle of said control signal.

6. A ground fault interrupter circuit as defined in claim 5 wherein:
said first condition of said control signal comprises having a phase relationship between said control signal and said alternating line voltage such that said capacitor is charged by said half-wave rectified signal during said second half cycle of said control signal when said discharge switch is open, thereby allowing an electrical charge to accumulate on said capacitor that is sufficient to trigger said triggering means during said second half cycle; and
said second condition of said control signal comprises having a phase relationship between said control signal and said line voltage that is opposite to that of said first condition, thereby having said half-wave rectified signal presented to said capacitor during the first half cycle of said control signal when said discharge switch is closed, thus dischargng said capacitor and preventing any charge from accumulating thereon.

7. A ground fault interrupter circuit as defined in claim 6 wherein said discharge switch comprises a solid state switch.

8. A ground fault interrupter circuit as defined in claim 7 wherein said solid state switch comprises a bipolar transistor.

9. A ground fault interrupter circuit as defined in claim 8 wherein a first side of said capacitor is connected to a ground potential and a second side of said capacitor is connected to said rectifying means, and further wherein said bipolar transistor switch is an NPN transistor having its collector terminal tied to the second side of said capacitor, its emitter terminal tied to said ground potential, and its base terminal coupled to said control signal, said control signal thus turning said NPN transistor on so as to short said second side of said capacitor to ground through said NPN transistor whenever said control signal significantly rises above ground potential, and said control signal further turning said NPN transistor off so as to allow charge to accumulate on said capacitor whenever said control signal drops below ground potential.

10. A ground fault interrupter circuit as defined in claim 8 wherein a first side of said capacitor is connected to a ground potential and a second side of said capacitor is connected to said rectifying means, and further wherein said bipolar transistor switch is a PNP transistor having its collector terminal tied to the second side of said capacitor, its base terminal tied to said ground potential, and its emitter terminal coupled to said amplifying means, said control signal of said amplifying means thus turning said PNP transistor on so as to short said second side of said capacitor to said amplifying means through said PNP transistor whenever the control signal significantly drops below ground potential, and said control signal turning said PNP transistor off so as to allow charge to accumulate on said capacitor whenever said control signal raises above ground potential.

11. A ground fault interrupter circuit as defined in claim 6 wherein said trigger means comprises a zener-diode having its cathode terminal coupled to said capacitor, said zener-diode being adapted to allow a current flow therethrough whenever the electrical charge accumulating on said capacitor exceeds a prescribed level.

12. A ground fault interrupter circuit as defined in claim 11 wherein said trigger means further comprises an electronic switch that closes in response to the current flow in said zener-diode, the closure of said electronic switch causing said trigger signal to be generated.

13. A ground fault interrupter circuit as defined in claim 12 wherein said electronic switch comprises a silicone controlled rectifier (SCR).

14. A ground fault interrupter circuit as defind in claim 3 wherein said bias means comprises means for allowing a bias current to flow through the second winding of said transformer means but not through the first winding of said transformer means, said bias current being derived from the current flowing through said first conductor.

15. A ground fault interrupter circuit as defined in claim 14 wherein said bias current has an rms value of approximately 5 ma.

16. A ground fault interrupter circuit as defined in claim 3 wherein said sensing means comprises a third winding coupled to said magnetic core, a first end of said third winding beinng connected to said neutral conductor and a second end of said third winding being coupled to said amplification means.

17. A ground fault interrupter circuit as defined in claim 16 wherein said bias means comprises means for allowing a bias current to flow through said third winding, said bias current being derived from the current flowing to the load through said first conductor.

18. A ground fault interrupter circuit as defind in claims 15 or 17 wherein said amplification means comprises an operational amplifier.

19. A ground fault interrupter circuit as defined in claim 18 further comprising power supply means coupled to said pair of conductors for generating a dc voltage adapted to power said operational amplifier.

20. A ground fault interrupter circuit as defined in claim 19 wherein at least said differential current sensing means, including said bias means and said operational amplifier, said charging circuit means, said trigger means, and said power supply means are encapsulated in an encapsulating material, said material having an exterior shape that facilitate the insertion of said encapsulated ground fault interrupter circuit into a standard electrical control panel.

21. A ground fault interrupter circuit for use in an electrical power distribution system that delivers alternating current from an input circuit to a load over a pair of conductors, a "hot" conductor of said pair of conductors having an alternating line voltage thereon, and a "neutral" conductor of said pair of conductors having a zero voltage thereon with respect to a ground potential, said ground fault interrupter circuit comprising:
switch means capable of opening at least said "hot" conductor of said pair of conductors for preventing current from being delivered to said load from the input circuit in response to a trigger signal;
differential current sensing means for generating a control signal having:
a frequency the same as said line voltage,
a first phase relationship with respect to said line voltage, and
an amplitude that decreases as the value of a ground fault current increases, said ground fault current being that current delivered to said load from said input circuit over said "hot" conductor that does not return to said input circuit over said "neutral conductor," said amplitude eventually decreasing to zero when said ground fault current reaches a prescribed level; a charging circuit coupled to said "hot conductor" comprising:

a storage element adapted to receive electrical charge during each cycle of said line voltage, said electrical charge being derived from the current flowing through said "hot" conductor, a discharge switch responsive to said control signal and connected to said storage element, said discharge switch being adapted to discharge said storage element when said switch is placed in a closed position, said discharge switch being placed in said closed position during a portion of each cycle of said control signal, said discharge switch further being placed in an open position during another portion of each cycle of said control signal, said discharge switch still further being placed in said open position when the amplitude of said control signal goes to zero, the phase relationship of said control signal with respect to said line voltage being selected such that said discharge switch is closed during that same portion of the control signal cycle during which said storage element receives electrical charge, whereby, electrical charge may not be received and held on said storage element so long as said control signal is present, and further whereby, electrical charge will be received and held on said storage element if the amplitude of said control signal goes to zero; and trigger means coupled to the storage element of said charging circuit for generating said trigger signal whenever a charge of sufficient magnitude is received and held on said storage element.

22. A ground fault interrupter circuit as defined in claim 21 wherein a charge sufficient to trigger said trigger means is received by said storage element within one cycle of said line voltage from the time said control signal goes to zero.

23. A ground fault interrupter circuit as defined in claim 22 wherein said control signal further has an increasing amplitude and a second phase relationship with respect to said line voltage whenever said ground fault current increases beyond said prescribed level, said second phase relationship being such that said control signal causes said discharge switch to be open during the same portions of the control signal cycle during which said storage element receives electrical charge, the amount of charge received during this charging cycle portion being sufficient to trigger said trigger means.

24. A ground fault interrupter circuit as defined in claim 23 wherein said second phase relationship of said control signal is inverted 180° from said first phase relationship.

25. A method for sensing a ground fault current and in response thereto interrupting an electrical power distribution system that delivers alternating current from an input circuit to a load over a pair of conductors, a first conductor of said pair of conductors having an alternating line voltage thereon, and a second conductor of said pair of conductors having a zero voltage thereon with respect to a ground potential, said ground fault current being that current delivered to said load from said input circuit over said first conductor that does not return to said input circuit over said second conductor, said method comprising the steps of:

(a) generating a control signal of the same frequency as said line voltage and having a first phase relationship with respect to said line voltage, said control signal having an amplitude that decreases as the value of said ground fault current increases, said amplitude decreasing to zero when said ground fault current reaches a prescribed level, and said control signal increasinng in amplitude and having a second phase relationship with respect to said line voltage whenever said ground fault current increases beyond said prescribed level;

(b) directing an electrical charge derived from the current flowing through said first conductor to a storage element during a portion of each cycle of said line voltage;

(c) discharging said storage element during that portion of each cycle of said line voltage during which said electrical charge is directed thereto whenever said control signal is present and said first phase relationship is maintained;

(d) allowing a charge to accumulate on said storage element during that portion of each cycle of said line voltage during which said electrical charge is directed thereto whenever said control signal is not present and whenever said control signal is present having said second phase relationship;

(e) generating a trigger signal whenever electrical charge is allowed to accumulate on said storage element above a prescribed level; and (f) opening said first conductor in response to said trigger signal.

26. A method for sensing a ground fault current and interrupting an electrical power distribution system in response thereto as defined in claim 25 wherein step (c) of discharging said storage element comprises:

(1) connecting a switch to said storage element that will discharge said storage element when in a closed position and allow an electrical charge to accumulate on said storage element when in an open position; and (2) controlling said switch with said control signal so that when said first phase relationship is maintained, said switch is closed during that portion of each cycle of said control signal during which said electrical charge is directed to said storage element.

27. A method as defined in claim 26 wherein step (d) of allowing a charge to accumulate on said storage element comprises:

(1) controlling said switch with said control signal so that when said control signal goes to zero said switch is always open; and (2) controlling said switch with said control signal so that when said second phase relationship is present said switch is open during that portion of each cycle of said control signal during which electrical charge is directed to said storage element.

28. A method as defined in claim 27 wherein said switch is a solid state switch that assumes said closed position during a first half cycle of said control signal and assumes said open position during a second half cycle of said control signal and in the absence of said control signal.

* * * * *